US011210863B1

(12) United States Patent
Yan et al.

(10) Patent No.: US 11,210,863 B1
(45) Date of Patent: Dec. 28, 2021

(54) SYSTEMS AND METHODS FOR REAL-TIME OBJECT PLACEMENT IN AUGMENTED REALITY EXPERIENCE

(71) Applicant: A9.com, Inc., Palo Alto, CA (US)

(72) Inventors: Geng Yan, San Carlos, CA (US); Xing Zhang, Santa Clara, CA (US); Amit Kumar K C, Sunnyvale, CA (US); Arnab Dhua, Cupertino, CA (US); Yu Lou, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 17/001,182

(22) Filed: Aug. 24, 2020

(51) Int. Cl.
*G06T 15/00* (2011.01)
*G06T 19/00* (2011.01)
*G06T 19/20* (2011.01)

(52) U.S. Cl.
CPC ............ *G06T 19/006* (2013.01); *G06T 19/20* (2013.01); *G06T 2200/24* (2013.01); *G06T 2210/04* (2013.01); *G06T 2219/2004* (2013.01)

(58) Field of Classification Search
CPC .................................................... G06T 19/006
See application file for complete search history.

(56) References Cited

U.S. PATENT DOCUMENTS

2013/0201210 A1* 8/2013 Vaddadi ................ G01B 11/25
345/632

2016/0225187 A1* 8/2016 Knipp ................... G06T 19/006
2020/0258315 A1* 8/2020 Li ......................... G02B 27/017

* cited by examiner

*Primary Examiner* — Charles Tseng
(74) *Attorney, Agent, or Firm* — Eversheds Sutherland (US) LLP

(57) ABSTRACT

Devices, systems, and methods are provided for real-time object placement guidance in augmented reality experience. An example method may include receiving, by a device having a sensor, an indication of an object to be viewed in an physical environment of the device. The example method may also include determining a 3D model of the physical environment using data of the physical environment captured by the sensor. The example method may also include determining that a first surface in the 3D model of the environment is a first floor space, and a second surface in the 3D model of the environment is a first wall space. The example method may also include determining that a portion of the first surface is unoccupied and sized to fit the object. The example method may also include determining a first location in the 3D model of the physical environment for placement of a virtual representation of the object based on a 3D model of the object, wherein the first location corresponds to the portion of the first floor space. The example method may also include generating the virtual representation of the object for display at the first location, the virtual representation of the object having a first orientation, wherein the first orientation is based on a second orientation of the second surface. The example method may also include generating a first real-time view of the physical environment comprising the virtual representation of the object within the portion of the first location and in the first orientation. In some cases, a real-time virtual overlay may also be generated in the physical environment, the real-time virtual overlay indicating a location of a floor space in the physical environment.

21 Claims, 7 Drawing Sheets

SYSTEMS AND METHODS FOR REAL-TIME OBJECT PLACEMENT IN AUGMENTED REALITY EXPERIENCE

BACKGROUND

In some online retail stores, a user may be provided the capability to preview a virtual representation of an object (for example, a couch, a table, or any other type of object) the user desires to purchase. For example, the user may access the online retail store through a mobile device application, and the mobile device application may include a feature that the user may select to view a virtual representation of the object in a physical room they are currently in through their mobile device. In some cases, this virtual representation of the object in the physical room may be performed using an augmented reality display through the user's mobile device. However, in some typical augmented reality systems used for this purpose, it may be challenging for a user to manipulate the virtual representation of the object within the augmented reality display to achieve a desired placement of the virtual representation of the object within the physical room.

Figure 1:
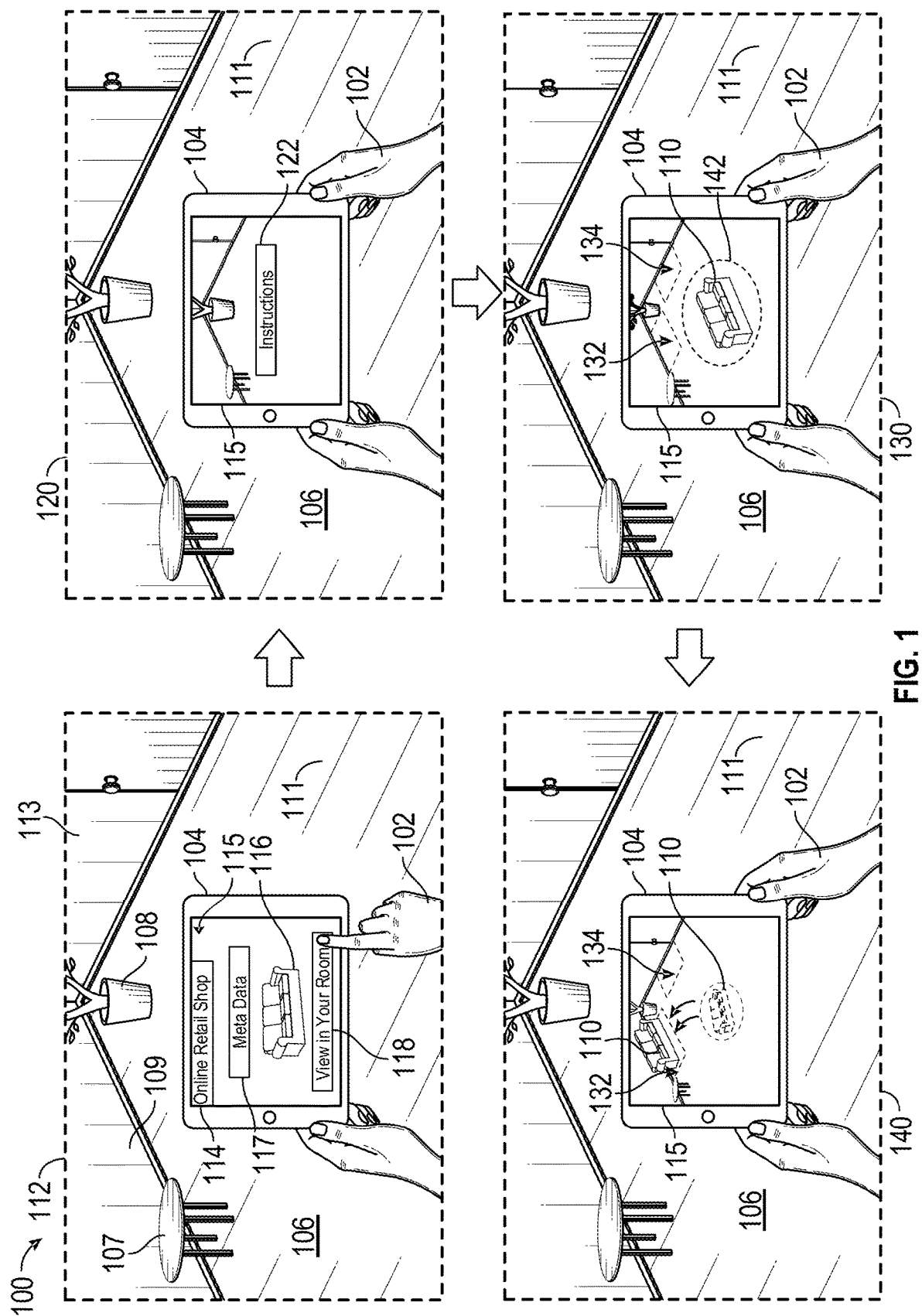
FIG. 1 illustrates an example use case for augmented reality object placement, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems and methods for real-time object placement in an augmented reality experience. More particularly, in some cases, the embodiments described herein may relate to an improved augmented reality system for an online retail store (it should be noted that while the improved augmented reality systems and methods are described in the context of an online retail store, the systems and methods may similarly be applied in any other augmented reality context other than an online retail store as well). An augmented reality system may be a system that combines real-world elements with virtual representations of objects through a single display viewable by the user. A virtual representation of an object, for example, may refer to a presentation of a 2D or 3D model of the object to a user in a 2D or 3D fashion. For example, a model of the object may be a 3D model, but a mobile device of a user may include a 2D display screen, such that the virtual object is technically a 2D presentation. Reference to a "3D representation of an object" made herein may refer to a 3D model of an object that may be presented on a 2D display of a user's mobile device. In some cases, however, the 3D model of the object may actually be presented in 3D, such that it appears to be coming out of the screen of the mobile device towards the user.

Figure 2:
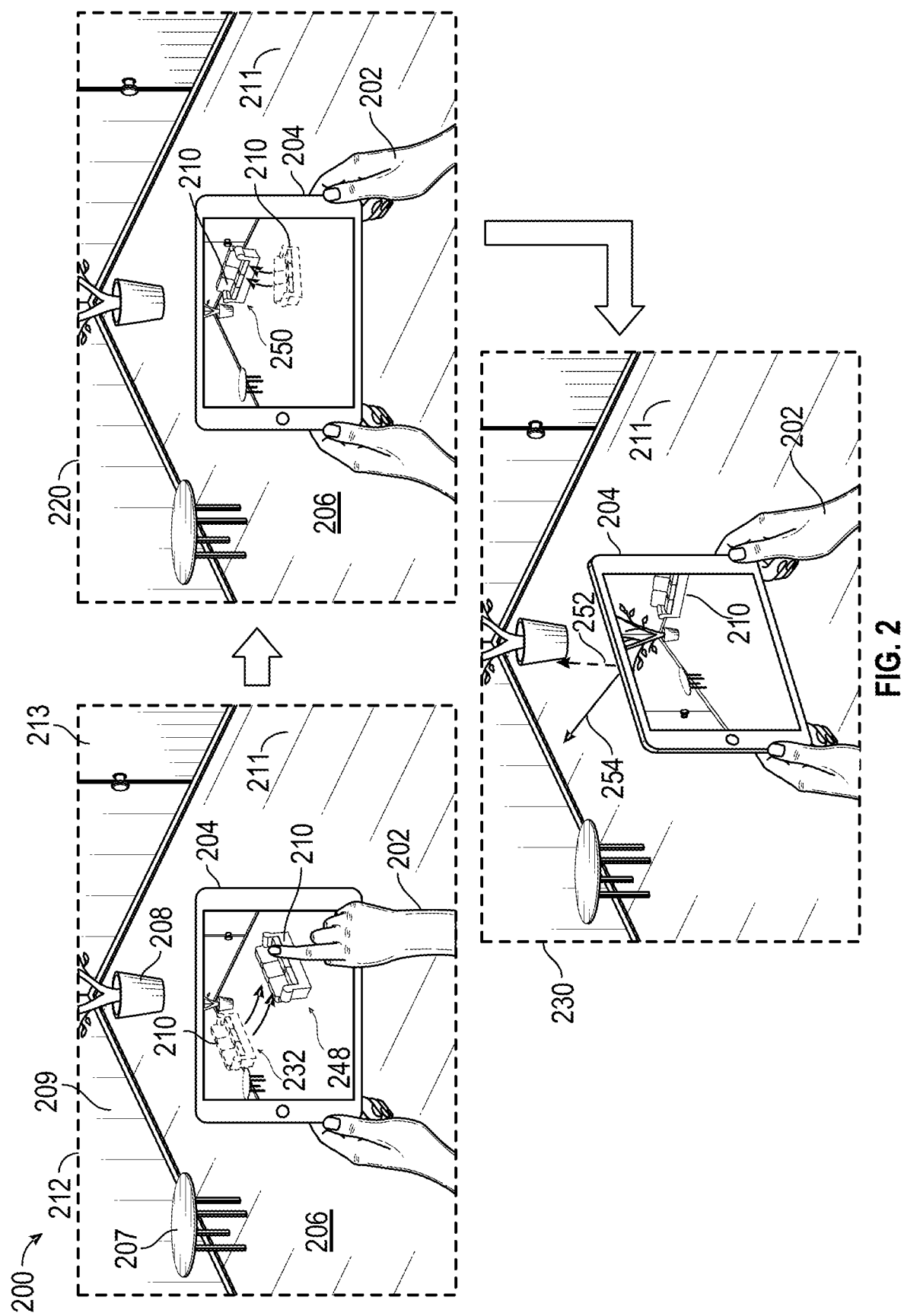
FIG. 2 illustrates an example use case for augmented reality object placement, in accordance with one or more example embodiments of the present disclosure.

In some embodiments, the user may view a real-time view from a camera (or other sensor) of their mobile device on the display of the mobile device, and the augmented reality system may present a virtual representation of an object within the real-time view on the display of the mobile device, such that it appears to the user that the virtual representation of the object is actually located within the physically environment of the real-time view (as exemplified through FIGS. 1-2 below). Some online retail stores, for example, that a user may access through an application on their mobile device, such as a browser or dedicated application, may provide the user the capability to preview a virtual representation of an item (for example, a couch) they wish to see within a physical environment using an augmented reality display presented on their mobile device. For example, there may be a selectable element within the user interface (UI) of the online retail store that the user may select to indicate that they wish to preview the item using augmented reality. Conventional augmented reality systems for the virtual display of items selected by users may simply project the virtual representation of the object in the augmented reality display without regard to the actual parameters of the physical environment, such as the location of floor, walls, and other real objects in the environment. The virtual representation of the object may simply be rendered in a live real-time view wherever the user drags the virtual representation of the object on the screen, even if the virtual representation of the object is dragged to a nonsensical location, such as on top of another real object in the physical environment.

In some embodiments, the systems and methods described herein may improve user experience of an augmented reality system for displaying virtual representations of objects through a mobile device of the user by automating certain aspects of the augmented reality experience for the user. For example, an initial location within the augmented reality display of a real environment (the terms "real environment" and "physical environment" may be used interchangeably herein) may be automatically selected for the placement of the virtual representation of the object. That is, the initial location in the augmented reality display in which the virtual representation of the object is placed may be selected by the augmented reality system based on, for example, an actual location where the item would likely be placed in the real environment. For instance, if the item is a couch, the initial location may be selected as a point where there is available floor space next to a wall as opposed to a space on the floor already occupied by another real object in the physical environment, such as a table, or an arbitrary default floor space location not located on a wall. This initial location may not necessarily be limited to floor space next to a wall, and may depend on the other features identified in the real environment, such as the location of a door or other piece of furniture. In addition, different virtual representations of objects may have an initial location determined based on other considerations. For example, the initial location for an area rug may be selected using a determination of a centralized location within a floor space of the real environment, and the orientation of the area rug may be selected based on the dimensions of the area rug relative to the available floor space at the central location. An initial location of a painting or picture frame may be selected based only on available wall space. An initial location of a coffee table may be based on the location of other objects in the real environment, such as couches or chairs. These are merely examples of how different considerations may be taken into account for different types of objects, and any other number of considerations may be taken into account depending on the type of item the user wishes to view in a real environment virtually using the augmented reality display.

In some embodiments, prior to the selection of the initial location for presentation of the virtual representation of the object within the augmented reality display on the user's mobile device, a pre-processing phase may take place. The pre-processing phase, for example, may take place following the user's indication that they desire to preview an item in the real environment using the augmented reality display. The pre-processing phase may begin by an application including an augmented reality module (also referred to herein as system) accessing a camera of the user's mobile device so that it may generate an user interface that may display a real-time view captured by the camera to the user through the display. It should be noted that although reference may be made to a camera of the device herein, the device may use any other sensor to capture data used for any of the purposes herein as well. For example, the mobile device may use a LIDAR sensor to capture data about the environment instead of, or in addition to, a camera of the mobile device. At this point, a virtual representation of the object, which may be an item selected by the user for viewing within the real environment within the user is located, may not yet be presented on the user interface (however, the virtual representation of the object may be received by the mobile device, for example, in the form of a 3D model. In some cases the 3D representation may be received from the online retail store). Instead, an instructional overlay may be presented to the user. The instructional overlay may indicate to the user that they should take certain actions to assist the augmented reality system in assessing the environment being captured by the camera. The instructions may be displayed as textual or graphical instructions on the display of the mobile device, may be provided to the user through audio (for example, through speakers of the mobile device), may be provided through a combination of the two, or may be provided to the user in any other suitable form. As an example, the instructions may indicate that the user should pan their mobile device in different directions in order to capture as much of the real environment where they are located as possible (for example, to capture as much of a room the user is in as possible). In some cases, the instructions may specifically indicate to the user where they should pan the mobile device. For example, the instructions may indicate that the user pan the mobile device in specific directions (up, down, left, right, etc.). As another example, the instructions may indicate that the user pan the mobile device towards specific portions of the environment, such as the location of any walls and/or floors. However, in other cases, the instructions may simply provide an indication for the user to generally pan the mobile device around the physical room, and once a sufficient amount of detail and information about the room has been captured through the camera of the mobile device, the application may indicate such to the user using text, graphics, audio, or haptic feedback. The instructions may ensure that enough information about the real environment and the elements included within the real environment are captured so that the augmented reality system may be able to accurately make decisions about how to present the virtual object. For example, if the user were to simply point the camera of the mobile device at the ground, the system may not have sufficient information about other important aspects of the environment, such as the location of walls and/or other objects existing in the environment, including distances and depths for purposes of generating a 3D model of the room.

In an embodiment, the augmented reality system may not instruct the user to pan through the real environment as a pre-processing phase. Instead, as an example, the virtual representation of the object initial placement may be determined on whatever information is available at the time an item is selected for viewing as a virtual representation of the object in the real environment of the user. For example, if the user were initially pointing the camera of their mobile device at the ground, then the augmented reality system may simply present the virtual representation of the object on the ground, a the spot the camera is viewing. If the user were to then pan the mobile device so the camera is pointed towards one or more walls, then the augmented reality system may adjust the position of the virtual representation of the object to a new location (for example, on a wall) based on the additional information collected about the real environment.

In some embodiments, the pre-processing may also involve the building of a three dimensional (3D) model of the real environment. That is, the data being captured by the camera (or other sensors) of the user's mobile device may be converted into a 3D model that may be used for subsequent processing and decision making (for example, where to initially place the virtual object, among other processing decisions that may be associated with the virtual presentation of the object on the user's mobile device display). This 3D model may comprise a 3D coordinate system characterized by one or more reference axes (for example, an X-axis, y-axis, and/or z-axis). In some instances, the 3D model may represent a 3D wireframe representation of the real environment. This 3D model may include defining boundaries of the real environment, such as walls, floors, ceilings, etc., and may include any real objects already present in the real environment, such as chairs, couches, plants, doors, and televisions, to name a few examples. The building of the 3D model of the real environment may further involve determining distances between the user's mobile device and objects within the environment, dimensions of the objects, distances between the objects in the environment, among other information that may be useful in determinations made in the presentation of the virtual object within the augmented reality display as may be described herein. Depth information may be determined, as an example, using active and passive stereo camera based-solutions, Time-of-Flight (ToF), structured light (SL) solutions, or any number of other methods for determining depth information for a real environment. Based on this information, a 3D coordinate system may also be developed for the 3D model, such that objects within the 3D model may be associated with particular coordinates in the 3D coordinate system. This depth information may also be used to determine the distance between various objects in the 3D model. Techniques such as simultaneous localization and mapping (SLAM) may also be implemented in constructing the 3D model.

In some embodiments, the pre-processing phase may involve the augmented reality system gathering certain data about the real environment. For example, as the user pans the mobile device around the real environment, the augmented reality system may be classifying certain points in the 3D model or groups of points in the 3D model (for example, of a frame) within the real-time view of the camera as certain types of objects in real-time. For example, the system may identify a first group of points in the 3D model as being associated with a wall, a second group of points in the 3D model as being associated with a floor, a third group of points in the 3D model being associated with a first object, such as a table, a fourth set of points in the 3D model being associated with a second object, such as a door, and so on. While identifying the types of objects that are located within the real environment, the system may also be applying semantic labels to particular points in the 3D model or groups of points in the 3D model. For example, the points in the 3D model described above as being identified as being associated with a wall may be provided a semantic label indicating that the points in the 3D model are associated with a wall. These semantic labels may be used by the system in subsequent decision making, such as determining where in the environment to initially place the virtual object. The semantic labels may remain associated with the points in the 3D model even if the camera of the mobile device pans so that those points in the 3D model are no longer within the field of view of the camera for a period of time. The semantic labels may also allow for different objects of a similar object type to be differentiated, such as a first wall, a second wall, a first table, a second table, and so on. In some cases, the pre-processing phase may also involve making additional determinations about objects in the environment, such as which portions of a given wall or floor are available as free wall space and/or free floor space (for example, unoccupied by any other object).

In some embodiments, during and/or subsequent to the pre-processing of the physical environment, one or more 2D or 3D overlays may be presented to the user through the real-time view of the physical environment. That is, the user may be able to view the real-time view through the display on their mobile device, and an overlay may be displayed within the real-time view of the physical environment as well (that is, the overlay may not actually be present in the real environment, but may rather be generated based on the determined 3D model of the real environment and presented in the real-time view of the real environment in certain locations. For example, one type of overlay may include an indication that a location within the real-time view corresponds to a certain type of surface. That is, surfaces within the real-time view that are determined, based on the 3D model, to be floor surfaces may be presented as being highlighted within the real-time view. The overlay may be presented in any other form as well, such as a series of repeated elements (for example, a series of dots rather than a complete highlighting of the surface). The overlay may also identify other elements in the real-time view, such as some or all of the real objects found within the real-time view, specific types of objects found within the real-time view, boundaries between floor surfaces and wall surfaces. The overlay may also present other types of information to the user, such as an overlay including textual information, such as dimensions of a highlighted floor space, a type of object, etc. The overlay may also be used for purposes that may be described below, such as presenting available floor space to a user and allowing the user to select between one or more areas of available floor space in which to initially present an item.

In some embodiments, once the pre-processing has been performed, the system may determine an initial location to place, that is, display or present, the virtual representation of the object in the augmented reality display of the mobile device. The presentation of the virtual representation of the object may involve presenting the object as a 3D model of the object on the display of the user mobile device. The initial location for display of the virtual representation of the object may be a location within the augmented reality display determined to be the most likely location where the item would be placed by the user if the user were to direct the placement of the virtual representation of the item in the real environment (for example, the room). The initial location may also be a location where the virtual representation of the item is physically (for example, based on the physical dimensions of the item) capable of being placed (for example, where there is available floor space in the room) within the portion of the real environment being viewed on the augmented reality display of the mobile device. Accordingly, the initial location may be determined based on one or more criteria.

In some embodiments, a first example of such criteria for selecting the initial location of the virtual representation of the object may be that the initial location be adjacent to one or more walls within the real environment. That is, the initial location may be a location at an intersection of a wall and a floor, such that the virtual representation of the object is presented on the floor and against a wall. Similarly, the initial location may be a location only on the wall, or the initial location may be nearby a wall but not in contact with the wall. In some cases, it may not be desirable for the virtual representation of the object to be automatically placed in an initial location against a wall or nearby a wall based on the type of object. For example, a more appropriate initial location for an object such as an area rug may be a more central floor location within the environment. Thus, this criteria may be dependent on the type of item that the user desires to view virtually in the real environment using the augmented reality display through their mobile device. For example, criteria for an item such as a painting or a picture frame may include that the initial location of the item is on a wall, but the initial location of a couch may be that the couch is located against the wall, but also on the floor, for example.

In some embodiments, a second example criteria for selecting the initial location of the virtual representation of the object may be that the user may be able to view the entire object in the augmented reality display of the mobile device. That is, after the pre-processing phase, the user may have the mobile device pointed towards one particular portion of the real environment. As an example, the user may have the mobile device pointed towards a corner of a room (as depicted in FIGS. 1-2), such that the real-time view captured by the camera of the mobile device includes a first wall and a second walls that come together at a corner. It may be determined that, with the camera of the mobile device pointed in this particular direction, more of the first wall may be displayed on the mobile device than the second wall.

Based at least in part on this, the augmented reality system may determine that the initial location of the virtual representation of the object is to be at the first wall rather than the second wall, as the virtual object, say a couch, may be able to be placed against the first wall so that the entire couch would be displayed in the augmented reality display of the mobile device.

In some embodiments, a third example of a criteria for selecting the initial location of the virtual representation of the object may be determining an amount of available floor space in a given location is sufficient. For example, if there is insufficient floor space to present the virtual representation of the object without the virtual object overlapping with other objects, then that location may not be selected as the initial location.

In some embodiments, a fourth example of a criteria may include that the object be presented nearby other real objects in the environment that the item would typically be positioned nearby. For example, a coffee table may likely be positioned in front of a couch or chairs in a real environment. These criteria are merely exemplary and not intended to be limiting. Any other criteria may also be employed in addition to, or in place of, these two described criteria. Additionally, machine learning may be employed that may develop criteria for determining the initial location. For example, the machine learning may determine that couches typically face towards the center of a room representing a real environment, face towards a television, etc. The machine learning may also determine likely combinations of objects and how they are positioned relative to one another in a real environment (for example, a plant would likely not be placed in the center of a room, but would rather be placed on a wall or next to, or on top of, another object in the room, a desk chair would likely be placed in front of a desk or table, etc.).

In some embodiments, the one or more criteria may be automatically prioritized by the system, such that certain criteria may carry more weight in determining the initial location of the virtual representation of the object in the augmented reality display. For example, if the one or more criteria were to include the two example criteria described above, the system may prioritize the sufficiency of the floor space over the virtual object being fully displayed within the current real-time view. In this example, if the augmented reality system identified two potential candidates for the initial location, one including a sufficient amount of floor space, but the virtual representation of the object would be presented partially outside of the current augmented reality display, and one where the virtual representation of the object would be completed within the current display, but includes an insufficient amount of floor space, then the initial location may be selected as the former location rather than the latter. It should be noted that this example of criteria prioritization is merely exemplary, and the criteria may be prioritized in any other manner. Additionally, in some instances, the prioritization may not be performed automatically by the augmented reality system, but instead the user may manually select the priority of some or all of the criteria for determining the initial location of the virtual representation of the object. For example, the user may select priorities through a settings menu, such as a preference, of the online retail store application. Additionally, the user may also be able to customize the criteria they want the augmented reality system to consider when determining the initial location of the virtual representation of the object as well.

In some embodiments, the selection of the initial location for display of the virtual representation of the object may also be determined by the user. In some instances, as described above, different areas determined to be unoccupied floor space may be highlighted, or otherwise indicated, on the real-time view of the physical environment on the user's mobile device display. The user may then select one of the highlighted areas to indicate that they want the virtual representation of the object to be initially displayed in that location. In some cases, the user may also be able to select any other location within the real-time view of the physical environment as well, even if the location is not unoccupied. In such cases, the virtual representation of the object may still be presented in the location selected by the user, or may automatically be repositioned to a another location including unoccupied floor space sufficiently large to fit the virtual representation of the object.

In some embodiments, once the initial location for presentation of the virtual representation of the object is determined, which may be a location or point within the 3D model of the physical environment, the automatic placement of the virtual representation of the object at the initial location may be performed. Automatic placement of the virtual representation of the object may be performed by first placing the virtual representation of the object within the selected unoccupied floor space within the real-time view of the physical environment. For example, unoccupied floor space that is large enough to fit the virtual representation of the object, and may either have been selected based on one or more criteria as described above, or manually selected by a user (for example, by selecting one highlighted unoccupied floor space of one or more available unoccupied floor spaces as described above). Once the virtual representation of the object is placed within the selected unoccupied floor space, if the virtual representation of the object is an object that should be aligned with a wall space, then it may be determined where the virtual representation of the object was placed in the selected unoccupied floor space relative to a wall space closest to the virtual representation of the object. This determination may involve determining one or both of a distance between the virtual representation of the object and the closet wall space and an orientation of the virtual representation of the object relative to an orientation of the closest wall space.

In some embodiments, the distance between the virtual representation of the object and the wall space may be determined using the 3D model of the real environment (for example, using a coordinate system of the 3D model of the environment). That is, a location of one or more points on the wall space within the coordinate system of the 3D model of the real environment may be compared to a location of one or more points on the virtual representation of the object. Any number and/or location of points on the object may be used. For example, a single point in the center of the object may be used or multiple points throughout the object be used. The comparison of the location of the one or more points associated with the wall space and the one or more points associated with the virtual representation of the object may be used to determine a distance between the wall space and the object. If it is determined that the distance is greater than a threshold distance, then it may be determined that the virtual representation of the object is not located against the wall, and the location of the virtual representation of the object may be updated to be within the threshold distance from the wall space.

In some embodiments, once it is determined that the virtual representation of the object is within the threshold distance of the wall space, the orientation of the virtual representation of the object may be determined relative to the orientation of the wall space. It should be noted that while it is described that the distance between the wall space and the virtual representation of the object is determined before the orientation of the virtual representation of the object relative to the orientation of the wall space, these operations may be performed in any order other than what is described herein. Additionally, while it is described that a distance between the virtual representation of the object and a wall is determined, a distance between the virtual representation of the object and any other frame of reference may also be used. For example, an edge of a floor space and/or another object in the real environment, to name a few non-limiting examples.

In some embodiments, the virtual representation of the object may not automatically be placed at an initial location determined to be the most likely location. Alternatively, in certain embodiments, the virtual representation of the object, regardless of the type of object, may be placed at a default location within the augmented reality display of the environment. This may be because the augmented reality system may not have sufficient information about the real environment to determine an initial location, or the user may have set a preference to have user input prior to selecting a location. Such input may be based a user touch input (for example, swipe), gesture input, voice input, or the like. Using the user input, the augmented reality system will determine the location for the virtual representation of the object. The user input may be indicative of an instruction to place the virtual representation of the object in a certain area or part of the real environment, such as adjacent to a certain wall. The augmented reality system may then determine the location for the virtual representation of the object and place it there.

Whether the virtual representation of the object is initially placed within a determined location in the augmented reality display of the environment, or in a default location (for instance, awaiting user input), may depend on a setting selected by the user. For example, the user may select a setting indicating that they desire for the virtual representation of the object to be automatically displayed in an initial location determined by the augmented reality system as the most likely place for the virtual representation of the object or the user may select a setting indicating that they desire the object to be placed in a default location (for example, in the center of the displayed portion of the real environment on the display of the mobile device) so that they may manually drag and drop the virtual representation of the object in a location of their choosing. In some cases, even if the user opts for the default placement and manual drag and drop setting, the system may still assist the user in the placement of the object by automatically moving the object to a particular location after the user completes a drag and drop movement of the virtual representation of the object. For example, the user may manually drag and drop the virtual representation of the object from the default placement location within the augmented reality display to a second location that is nearby a wall. The system may then automatically reposition the object in a correct orientation against the wall (for example, if the object is a couch, the couch may automatically be repositioned to be against the wall with the back of the couch being against the wall). Additionally, even if the user selects a setting indicating that they want the augmented reality system to automatically determine the initial location for presentation of the virtual representation of the object, the user may still drag and drop the virtual representation of the object at another location after the virtual representation of the object is initially displayed at the initial location (for example, as depicted in FIG. 2). Furthermore, the user may also swipe in a general direction on the display of the mobile device starting from the location of the virtual representation of the object, and the virtual representation of the object may automatically reposition itself in a logical location within that general direction. For example, if the user swipes towards a wall from the location of the virtual representation of the object, then the virtual representation of the object may be repositioned against the wall. The virtual representation of the object may also be automatically re-oriented so that it is in a logical orientation against the wall. For example, if the initial orientation of a couch is with the front of the couch facing towards the wall with the couch being in the center of the augmented reality display, and the user swipes towards a wall, then the couch may be reoriented so that the backside of the couch is against the wall.

In some embodiments, this automatic repositioning of the virtual representation of the object after being manually dragged (and/or swiped) by the user may be based on the virtual representation of the object being dragged and dropped to within a threshold distance of a secondary location. A secondary location may be a location within the augmented reality display that may be determined to be a potential option for the virtual representation of the object to be repositioned to based on a number of criteria. The criteria may include some or all of the same criteria used to determine the initial location in which the virtual representation of the object is displayed in the augmented reality display. In some cases, however, the criteria used to determine potential secondary locations may be different than the criteria used to determine the initial location of the virtual representation of the object within the augmented reality display. As an example, the criteria may include a determination that the location includes available floor and/or wall space (that is, no objects currently exist in the location). The criteria may also include a determination that the location includes enough available floor space and/or wall space to fit the virtual representation of the object (for example, if there is only four feet of available floor space in a location and a couch is six feet wide, then that location may not be selected as a potential secondary location for the couch to automatically be repositioned to). Additionally, while the potential secondary locations are described herein with reference to walls, it should be noted that the secondary location does not necessarily need to be associated with a wall. For example, a secondary location may be located at available floor space that is not adjacent to a wall. Whether a potential secondary location that is not adjacent to a wall is identified may, in some instances, depend on the type of object. For example, an area rug may include potential secondary locations not adjacent to a wall, but a couch may only include secondary locations adjacent to a wall. This is merely an example and is not intended to be limiting. Furthermore, potential secondary locations may also be based on user-selecting settings. For example, a user may indicate that they generally want all objects to be automatically repositioned adjacent to a wall, so in this case, only secondary locations adjacent to a wall may be considered. The user may also more specifically select settings pertaining to specific types of objects. For example, the user may indicate through a setting selection that lamps should only be repositioned to secondary locations within a threshold distance from other objects.

In some embodiments, once potential secondary locations are identified within an augmented reality display, if any part of the virtual representation of the object is determined to be within the threshold distance (or moved to within a threshold distance) of the secondary location, then the virtual representation of the object may be automatically repositioned to the secondary location at an appropriate orientation (for example, as described above with respect to the initial placement of the virtual representation of the object). In some cases, the threshold distance determination may not be based on any part of the virtual representation of the object being within the threshold distance, but may alternatively be based on a particular portion of the virtual representation of the object being within the threshold range (for example, a center point of the object or a side point of the object) (this may also apply to the initial placement of the virtual representation of the object or any other placements of the virtual representation of the object as well). On the other hand, if the object is not within the threshold distance of a secondary location, then the virtual representation of the object may remain in the location where the user manually dragged the virtual representation of the object (for example, may not be repositioned to a secondary location). For example, if the virtual representation of the object is dragged to a location in the center of a room away from any walls, then the virtual representation of the object may remain in that location in the center of the room rather than being repositioned to a second location, such as against a wall. In some instances, whether the virtual representation of the object is repositioned at a secondary location may also be determined based on a user setting. For example, the user may select a setting that the repositioning should never be performed and that the virtual representation of the object should only be placed at a location the user drags the virtual representation of the object to. As another example, the user may also indicate a level of assistance that the system should provide in automatically repositioning, such as through settings indicating which types of secondary locations should be used for automatic repositioning or the threshold distance from the secondary location at which the automatic repositioning should take place, among other settings. For example, the user may indicate that they want the virtual representation of the object to be automatically repositioned against a wall when it is dragged to within the threshold distance of the wall, but do not want the virtual representation of the object to automatically reposition against another object, such as a door. As another example, the user may indicate that they only want the virtual representation of the object to be positioned against an empty wall. As another example, the user may indicate that they do not want the virtual representation of the object to touch any other objects. These are just a few examples of settings a user may select to indicate what types of secondary locations they desire virtual representation of the objects to be automatically repositioned to, any other number of settings may similarly be applicable.

In some embodiments, the user experience of the display of the virtual representation of the object through the augmented reality display on the mobile device may also be improved in a number of other ways beyond automatic initial placement of the virtual representation of the object. One additional improvement may be the ability of the augmented reality display to keep the virtual representation of the object positioned in a particular location even if the user pans the camera of the mobile device away from the location of the virtual representation of the object in the real environment. That is, the user may pan their mobile device so that the particular location is outside a current field of view of the camera for a period of time, but then the virtual representation of the object reappears as the camera pans back so that its field of view covers the locations where the virtual representation of the object was placed. For example, the user may pan the camera of their mobile device to view another area of a room or may physically leave the room in which the virtual representation of the object is being displayed through the augmented reality of the mobile device. The user may then no longer be able to view the virtual representation of the object, but if the user were to then pan back to the particular location or walk back into the room and point the camera at the particular location where the virtual representation of the object was placed, the virtual representation of the object may again be displayed at the same position. This may be possible because the virtual representation of the object may be assigned one or more coordinates in the coordinate system of the 3D model of the real environment as described above. This may provide a more seamless previewing experience for the user, as they can preview how the item may exist in the physical environment from different perspectives.

In some embodiments, a further improvement may be in the way the augmented reality system provides feedback to the user through the mobile device. More particularly, the augmented reality system may cause the mobile device to provide feedback to the user as guidance when the user is manipulating the virtual representation of the object within the augmented reality display (for example, dragging and dropping the object in various locations, re-orienting the object, etc.). This feedback may be in the form of an audio content, a visual content, and/or haptic feedback provided through the mobile device. For example, when the user drags the virtual representation of the object to a location such that the footprint of the virtual representation of the object overlaps with floor area occupied by another object, then the system may generate feedback in the form of an audio feedback, visual feedback via the display device, and/or haptic feedback, as described above. As another example, when the user tries to move the virtual representation of the object beyond a wall, the system would again generate a feedback when the footprint of the virtual representation of the object touches the wall within the augmented reality display. This feedback may be especially beneficial when the user selects the setting allowing them to freely manipulate the positioning of a virtual representation of the object without the augmented reality system automatically placing the virtual representation of the object in a particular location.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example use case 100 for augmented reality object placement, in accordance with one or more example embodiments of the present disclosure.

Referring to FIG. 1, the use case 100 may depict a user 102 having or otherwise associated with one or more devices 104, such as a mobile phone, laptop, tablet, or the like. The user 102 may be physically located within an environment 106, which may be a physical room in the user's residence, for example, or any other type of physical environment (the terms "real" and "physical" environment may be used interchangeably herein). The environment 106 is depicted as including one or more example objects that might occupy the environment 106, such as an end table 107, a plant 108, and a door 113. The environment may also include one or more walls 109 and a floor 111. It should be noted that the objects depicted in the figure are merely exemplary, and any other types and/or combination of objects may similarly exist in the environment 106. The mobile device 104 may include a display 115, which may be capable of displaying an augmented reality view of the environment 106 in which the user 102 is located (as shown in scenes 112, 120, 130, and 140 of the use case 100, as described below). The augmented reality view of the environment 106 may be capable of displaying a virtual representation of the object 110 within the augmented reality view of the environment 106 without the virtual representation of the object 110 being physically present in the environment 106. This may be beneficial, for example, if the user 102 desires to preview what an item being represented by the virtual representation of the object 110 would look like in the environment 106 before they decide to purchase the item. In this particular use case 100, the object may be described and depicted as a couch for exemplification purposes, however, the object may include any other type of items the user 102 can purchase, other than furniture and decorations, such as apparel.

Still referring to FIG. 1, the use case 100 may initiate with a first scene 112. The first scene 112 of the use case 100 may involve the user 102 browsing an online retail store 114 through the mobile device 104 (for example, using an application on the mobile device 104). While browsing the online retail store 114, the user 102 may come across a particular item 116 that the user 102 may be interested in purchasing. The item 116 may be associated with descriptive information 115. The descriptive information 117 (for example, metadata) may include descriptive information about the item 116, such as its dimensions, material, pricing, etc. In some cases, the online retail store 114 may also provide the user 102 the capability to preview the item 116 in the environment 106 through a display of the mobile device 104. For example, the online retail store 114 may include a selectable element 118 that the user 102 may select to indicate they desire to preview the item 116 in the environment 106 before they make a purchasing decision.

Still referring to FIG. 1, the use case 100 may proceed to a second scene 120. The second scene 120 of the use case 100 may take place subsequent to the user 102 indicating that they desire to preview the item 116 they are interested in purchasing. The second scene 120 of the use case 100 may involve an initiation phase during which pre-processing takes place before the item 116 is presented on the display 115 as a virtual representation of the object 110 using augmented reality. The second scene 120 may proceed as follows. Once the user 102 has indicated that they desire to preview the item 116 (for example, by selecting the selectable element 118), the online retail store may create a user interface including a real-time view of the environment 106 from the perspective of the mobile device 104. For example, a camera (not shown in the figure) of the mobile device 104 may be accessed by and activated, and a real-time view of the camera may be displayed on the display 115 of the mobile device 104 (or the camera may already be activated, and the mobile device 104 may simply begin displaying the real-time view being captured by the camera on the display 108. It should be noted that while the use case 100, as well as any other use cases or descriptions provided herein, may describe using a camera of a mobile device, any other sensors may similarly be used to capture data about the real environment 106. For example, in addition to, or instead of, the camera being used, a LIDAR sensor may be used to determine data about the real environment 106. The use of sensors other than a camera may also be applicable for any other purposes beyond capturing data about the real environment 106 as well. That is, any recitation of a camera may similarly be replaced with another type of sensor or sensors. In addition to the real-time view of the environment 106, the online retail store application running on the mobile device 104 may overlay instructions 122 on the display. The instructions 122 may be displayed as one or more of textual and/or graphical instructions on the display of the mobile device 104, may be provided to the user through audio (for example, through speakers of the mobile device), may be provided through a combination of the two, or may be provided to the user in any other suitable form. As an example, the instructions 122 may indicate that the user should pan their mobile device in different directions in order to capture as much of the real environment 106 they are in as possible (for example, to capture as much of a room the user is in as possible). In some cases, the instructions 122 may specifically indicate to the user where they should pan the mobile device For example, the instructions 122 may indicate that the user pan the mobile device in specific directions (up, down, left, right, etc.). As another example, the instructions 122 may indicate that the user pan the mobile device towards specific portions of the physical environment 106, such as the location of any walls and/or floors. However, in other cases, the instructions 122 may simply provide an indication for the user the generally pan the mobile device around the room until it is determined that a sufficient amount of the room has been captured through the camera of the mobile device.

In some embodiments, the instructions 122 may ensure that enough information about the environment 106 and the elements included within the environment 106 is captured so that the augmented reality system may be able to accurately make decisions about how to display the virtual representation of the object 110. For example, if the user were to simply point the camera of the mobile device at the ground, the system may not have any information about other important aspects of the environment, such as the location of walls and/or other objects existing in the environment. Without this information, there may be no frame of reference for determining how to present the virtual representation of the object 110. The instructions may also allow the for a 3D model of the real environment 106 to be constructed. That is, the two dimensional images being captured by the camera of the user's mobile device 104 may be converted into a 3D model that may be used for subsequent processing and decision making (for example, where to initially place the virtual representation of the object 110, among other processing decisions that may be associated with the virtual presentation of the object on the user's mobile device display). This 3D model may include defining boundaries of the real environment 106, such as walls, floors, ceilings, etc., and may include any real objects already present in the real environment, such as chairs, couches, plants, doors, and televisions, to name a few examples. The building of the 3D model of the real environment may further involve determining distances between the user's mobile device 104 and objects within the environment, dimensions of the objects, distances between the objects in the environment 106, among other information that may be useful in determinations made in the presentation of the virtual representation of the object 110 within the augmented reality display as may be described herein. Depth information may be determined, as an example, using active and passive stereo camera based-solutions, Time-of-Flight (ToF), structured light (SL)

solutions, or any number of other methods for determining depth information for a real environment. These, and other methods, may similarly be used to determine the relative location of the mobile device 104 within the real environment 106. Based on this information, a 3D coordinate system may also be developed for the 3D model, such that objects within the 3D model may be associated with particular coordinates in the 3D coordinate system.

In some embodiments, the augmented reality system may function in real-time instead of requiring the user to pan through the environment prior to initiating the augmented reality presented of the virtual representation of the object 110. For example, if the user were initially pointing the object at the floor, then the augmented reality system may simply present the virtual representation of the object 110 on the floor, at the location where the camera is pointing. If the user were to then pan the mobile device so the camera is pointed towards one or more walls, then the augmented reality system may adjust the position of the virtual representation of the object 110 to a new location (for example, on a wall) based on this updated information collected by the addition images of the environment. That is, once a requisite amount of information is collect via the images form the camera, the augmented reality system may start automatically placing the virtual object 110 within the real environment 106.

Still referring to FIG. 1, the use case may proceed with a third scene 130. The third scene 130 of the use case 100 may take place after the initiation step of the second scene 120 of the use case 100. In the third scene 130 of the use case 100, the item 116 may be presented on the display of the mobile device 104 as a virtual representation of the object 110 through augmented reality. That is, the virtual representation of the object 110 may be presented through the augmented reality as if the virtual representation of the object 110 were in the environment 106, but the virtual representation of the object 110 may not actually be in the environment 106, and may be virtually displayed within a real-time view of the real environment 106. That is, the virtual representation of the object 110 may be overlaid on top of a particular portion of the real-time view of the real environment 106 being captured by the camera (or other sensor(s)) of the user's mobile device 104. The third scene 130 of the use case 100 may also depict results of the pre-processing performed during the second scene 120 of the use case 100. For instance, the third scene 130 may depict areas of the environment 106 determined to include available floor space (for example, a first floor space 132 and a second floor space 134) in which the virtual representation of the object indicative of the real object 116 may be place. These determined available floor spaces 132, 134 may not actually be visually marked or identified within the augmented reality user interface, but may be identified in scene 130 for illustrative purposes in dashed lines to provide a visual indication of where it is determined that available floor space exists (however, in alternative embodiments, the available floor space may actually be visibly identified to the user 102 through the augmented reality user interface to provide the user 102 with information about available floor space, for example, as described above as highlighting over the real-time view of the physical environment). While not in the figure, for purposes of the present use embodiment, the example first floor space 132 may be larger in size than the second floor space 134.

In some embodiments, the virtual representation of the object 110 may be associated with a data structure that may include information about the virtual representation of the object 110 within the augmented reality display. For example, the data structure may include information, such as a current orientation of the virtual representation of the object 110 and a location of the virtual representation of the object 110 within the 3D model of the environment 106. The orientation data may indicate the orientation of the virtual representation of the object 110 with respect to a reference orientation or the orientation of the virtual representation of the object 110 with respect to one or more other objects within the real environment 106. The location of the virtual representation of the object 110 may be represented in the form of one or more coordinates within the 3D model. The coordinates may be representative of a single point on the object (for example, the center of the object) or multiple points on the object (for example, the center and outer boundaries of the object). This data structure may be used in determinations regarding the positioning of the virtual representation of the object 110 within the augmented reality display. For example, the location information in the data structure may be used to determine the distance between the virtual representation of the object 110 and a wall, and the orientation information may be used to determine the orientation of the virtual representation of the object 110 with respect to the wall.

Still referring to FIG. 1, the use case 100 may proceed with a fourth scene 140. The fourth scene 140 of the use case 100 may involve automatic positioning of the virtual representation of the object 110 in the augmented reality display of the environment 106 presented through the mobile device 104 of the user 102. That is, the virtual representation of the object 110 may be presented in the augmented reality user interface at a first location 142 in third scene 130, and may be automatically repositioned to the second location 132 in the fourth scene 140. Alternatively, scene 130 and scene 140 may be combined such that the virtual representation of the object 110 may be initially displayed in the location 132 rather than being displayed in the default location 142 and automatically repositioning to the second location 132. In some embodiments, the virtual representation of the object 110 may be automatically positioned in the second location 132 within the augmented reality display of the environment 106 based on the pre-processing performed in connection with the second scene 120 and/or third scene 130 of the use case 100. For example, since the item 116 described in this particular use case 100 is a couch, the virtual representation of the object 110 may be automatically placed in a particular orientation (for example, facing forwards away from a wall) with a backside of the virtual representation of the object 110 affixed, that is, positioned adjacent, to a wall 109 of the augmented reality display and a bottom portion of the virtual representation of the object 110 affixed to a floor 111 of the augmented reality display. This may be an improvement over conventional systems for displaying virtual representation of the objects using augmented reality because the virtual representation of the object 110 may be automatically placed in a region of the environment 106 in the augmented reality display where the item 116 would potentially, if not likely, be placed in the real environment 106. In conventional systems, the virtual representation of the object 110 may be placed in the augmented reality display in any number of arbitrary locations without any regard for the layout of the environment 106 and any objects that may exist in the environment 106. For example, in conventional systems even if the user 102 were to drag the virtual representation of the object 100 to a location in the augmented reality display that already includes another object, the conventional system may not have the capability to recognize this, and may simply allow the virtual representation of the object 110 to be placed in that location which is already occupied by another object. This may make previewing the item 116 in a location in the environment 106 where it may actually be placed difficult, as the user 102 may have to manually manipulate the object to go exactly in the environment 106 where the user 102 wants to preview the item 116.

In some embodiments, the second location 132 (which may be the same as the initial location described above) may be selected (also referred to herein as determining) based on one or more criteria. One example of such criteria may be that the second location 132 is chosen such that the user 102 may be able to view the entire virtual representation of the object 110 in the augmented reality user interface of the mobile device 104. That is, after the pre-processing performed in scene 120 of the use case, the user 102 may have the mobile device 104 pointed towards one particular portion of the environment 106. As an example, the user may have the mobile device pointed towards a corner of a room, such that the real-time view captured by the camera of the mobile device 104 includes a first wall 109 and a second wall 113. It may be determined that, with this camera of the mobile device 104 pointed in this particular direction, more of the first wall 109 is displayed on the mobile device 104 than the second wall 113, indicating more of a user interest in the first wall 109. Based on this, the system may determine that the initial location of the virtual representation of the object should be the first wall 109 rather than the second wall 113. This may be based on a determination of user interest, as discussed above, and/or may be based on as the first wall 109 may be able to display on the mobile device 104 display the entire virtual representation of the object 110, whereas positioning the object on the second wall 113 may result in part of it being out of view on the display 115. Another example of a criteria may be an amount of available floor space in a given location. For example, if there is insufficient floor space to present the virtual representation of the object 110 without the virtual representation of the object 110 overlapping with other objects, then the location at that floor space may not be selected as the initial location. For example, as depicted in the figure, the floor space 132 may be larger than the floor space 134. A third example of a criteria may include that the virtual representation of the object 110 be presented nearby other real objects in the environment 106 that the item 116 would typically be positioned nearby. For example, a coffee table may likely be positioned in front of a couch or chairs in a real environment. These criteria are merely exemplary and not intended to be limiting. Any other criteria may also be employed in addition to, or in place of, these two described criteria. Additionally, machine learning may be employed that may develop criteria for determining the initial location. For example, the machine learning may determine that couches typically face towards the center of a room representing a real environment, face towards a television, etc. The machine learning may also determine likely combinations of objects and how they are positioned relative to one another in a real environment (for example, a plant would likely not be placed in the center of a room, but would rather be placed on a wall or next to, or on top of, another object in the room, a desk chair would likely be placed in front of a desk or table, etc.).

In some embodiments, the one or more criteria may be automatically prioritized by the system, such that certain criteria may carry more weight, or take priority, in determining the initial location of the virtual representation of the object 110 in the augmented reality display. For example, if the one or more criteria were to include the two example criteria described above, the system may prioritize the sufficiency of the floor space over the object being fully displayed within the current augmented reality real-time view on the display 115. In this example, if the augmented reality system identified two potential candidates for the initial locations, one including a sufficient amount of floor space, but the virtual representation of the object would be presented partially outside of the current user interface on the display 115, and one where the virtual representation of the object would be completely viewable within the display, but includes an insufficient amount of floor space, then the initial location may be selected at the former location rather than the latter. It should be noted that this example of criteria prioritization is merely exemplary and criteria may be prioritized in any other manner.

Additionally, in some instances, the prioritization may not be performed automatically by the augmented reality system, but instead the user 102 may manually select the priority of some or all of the criteria for determining the initial location of the virtual representation of the object. For example, the user 102 may select priorities or user preferences through a settings menu of the online retail store application being executed by the mobile device 104. Additionally, the user 102 may also be able to customize the criteria they want the augmented reality system to consider when determining the initial location of the virtual representation of the object 110 as well.

FIG. 2 illustrates an example use case 200 for augmented reality object placement, in accordance with one or more example embodiments of the present disclosure. FIG. 2 may include a continuation of the use case 100 depicted in FIG. 1, and may depict some additional features of the augmented reality display of the virtual representation of the object. To this end, FIG. 2 may include some of the same elements depicted in FIG. 1. For example user 202 may be the same as user 102, mobile device 204 may be the same as mobile device 104, environment 206 may be the same as environment 106, end table 207, plant 208, and floor 211 may be the same as end table 107, plant 108, and floor 111. In addition, the display of mobile device 204 may be the same as the display of the mobile device 104, and the virtual representation of the object 210 may be the same as virtual representation of the object 110.

Still referring to FIG. 2, the use case 200 may begin with a first scene 212. The first scene 212 of the use case 200 may involve the user 202 dragging the virtual representation of the object 210 from a first location 232 to a second location 248 within the augmented reality display of the environment 106 (or otherwise swiping in the general direction of the second location 248). Once the user 202 has dragged the virtual representation of the object 210 to the second location 248 within the augmented reality display of the environment 206, the use case 200 may proceed to a second scene 220. The second scene 220 of the use case 200 may involve the virtual representation of the object 210 automatically repositioning to a third location 250 within the augmented reality display of the environment 106, as depicted in the figure (in some instances, the third location 250 may be the same as the "secondary location" described herein). For example, the virtual representation of the object 210 may be repositioned onto another wall within the augmented reality display of the environment 106. That is, the system may assist the user 202 in affixing the virtual representation of the object 210 to another location in the augmented reality display of the environment 206 where the user 202 is likely to want to preview the virtual representation of the object 210. In some embodiments, the third location 250 may include a portion of the wall that is closest to the second location 248 that includes free floor space. In some cases, the virtual representation of the object 210 may only be repositioned in the third location 250 if the virtual representation of the object 210 is dragged to within a threshold distance from a position on the wall where there is adequate space for the virtual representation of the object (and/or based on the application of one of more criteria). Thus, if the virtual representation of the object is within a threshold distance of a suitable location for the virtual representation of the object, then the augmented reality system may automatically place the virtual representation of the object in that new location. If there is more than one location within the threshold distance, then the criteria can be utilized to determining which location to which the virtual representation of the object is automatically moved. In some embodiments, the criteria may just be which location is closest to the virtual representation of the object at location 248.

In another example, if the user 210 drags the virtual representation of the object 210 to the middle of the augmented reality display of the environment 206 at third location 248, they may not desire the object to be automatically repositioned on another wall, but may want to actually preview the virtual representation of the object 210 in the middle of the room. In some cases, the repositioning of the virtual representation of the object 210 after the user 202 manually drags the virtual representation of the object 210 may not automatically be performed, but may instead be performed based on a user indication that the repositioning should be performed. For example, the augmented reality display may include a selectable element, such as a user preference, that the user 202 may select that may cause the virtual representation of the object 210 to then be repositioned to the third location 250. The determination as to whether the virtual representation of the object 210 should always be automatically repositioned or whether the repositioning should be based on a manual user 202 indication may be a setting included within the application that the user 202 may choose from.

In some embodiments, potential options for the one or more third locations in which the virtual representation of the object 210 may be automatically repositioned may be determined prior to the virtual representation of the object 210 being dragged by the user 202. Thus, when the user 202 drags the virtual representation of the object 210 to a second location (for example, second location 248 depicted in FIG. 2), it may be determined which third location the second location is closest to, and the virtual representation of the object 210 may then be automatically repositioned at that third location if it is within the threshold distance of that third location. In some cases, the virtual representation of the object 210 may be repositioned to that closest third location even if it is not within a given threshold distance of the third location. In some cases, the user 202 may swipe in a general direction rather than drag and drop the virtual representation of the object 210 to a second location 248. In these cases, it may be determined which of the potential third locations is closest to the direction of the swipe, and the virtual representation of the object 210 may be automatically repositioned to that third location based on the direction of the swipe.

In some embodiments, the third location as described with respect to FIG. 2 may be similar to the secondary location described above. Thus, a potential option for a third location may be a location within the augmented reality display that may be determined to be a potential option for the virtual representation of the object to be repositioned to based on a number of criteria. The criteria may include some or all of the same criteria used to determine the initial location in which the virtual representation of the object 210 is displayed in the augmented reality display. In some cases, however, the criteria used to determine potential third locations may be different than the criteria used to determine the initial location of the virtual representation of the object within the augmented reality display. As an example, the criteria may include a determination that the location includes available floor and/or wall space (that is, no objects currently exist in the location). The criteria may also include a determination that the location includes enough available floor space and/or wall space to fit the virtual representation of the object 210 (for example, if there is only four feet of available floor space in a location and a couch is six feet wide, then that location may not be selected as a potential third locations for the couch to automatically be repositioned to). Additionally, while the potential third locations are described herein with reference to walls, it should be noted that a third location not necessarily need to be associated with a wall. For example, a third location may be located at available floor space that is not adjacent to a wall. Whether a potential third location that is not adjacent to a wall is identified may, in some instances, depend on the type of object. For example, an area rug may include potential third locations not adjacent to a wall, but a couch may only include third locations adjacent to a wall. This is merely an example and is not intended to be limiting. Furthermore, potential third locations may also be based on user-selecting settings. For example, a user may indicate that they generally want all objects to be automatically repositioned adjacent to a wall, so in this case, only third locations adjacent to a wall may be considered. The user may also more specifically select settings pertaining to specific types of objects. For example, the user may indicate through a setting selection that lamps should only be repositioned to third locations within a threshold distance from other objects.

Still referring to FIG. 2, the use case 200 may proceed with a third scene 230. The third scene 230 of the use case 200 may illustrate the ability of the augmented reality display to keep the virtual representation of the object 210 positioned in a particular location (for the example the fourth location 250) even if the user 202 pans the camera of the mobile device 204 to face a different direction within the environment 206. For example, the user 202 may pan the camera of their mobile device 204 from a first direction 252 associated with scenes 212 and 220 to view a second direction 254 facing a different area of a room or may physically leave the room in which the virtual representation of the object 210 is being displayed through the augmented reality of the mobile device 204. The user 202 may then no longer be able to view the virtual representation of the object 210, but if the user 202 were to then pan back to the particular location or walk back into the room and point the camera at the particular location, the virtual representation of the object 210 may again be viewable as part of the user interface on display 215 at the same location where it was placed. This may provide a more seamless previewing experience for the user 202, as they can preview how the item may exist in the physical environment from different perspectives.

Figure 3A:
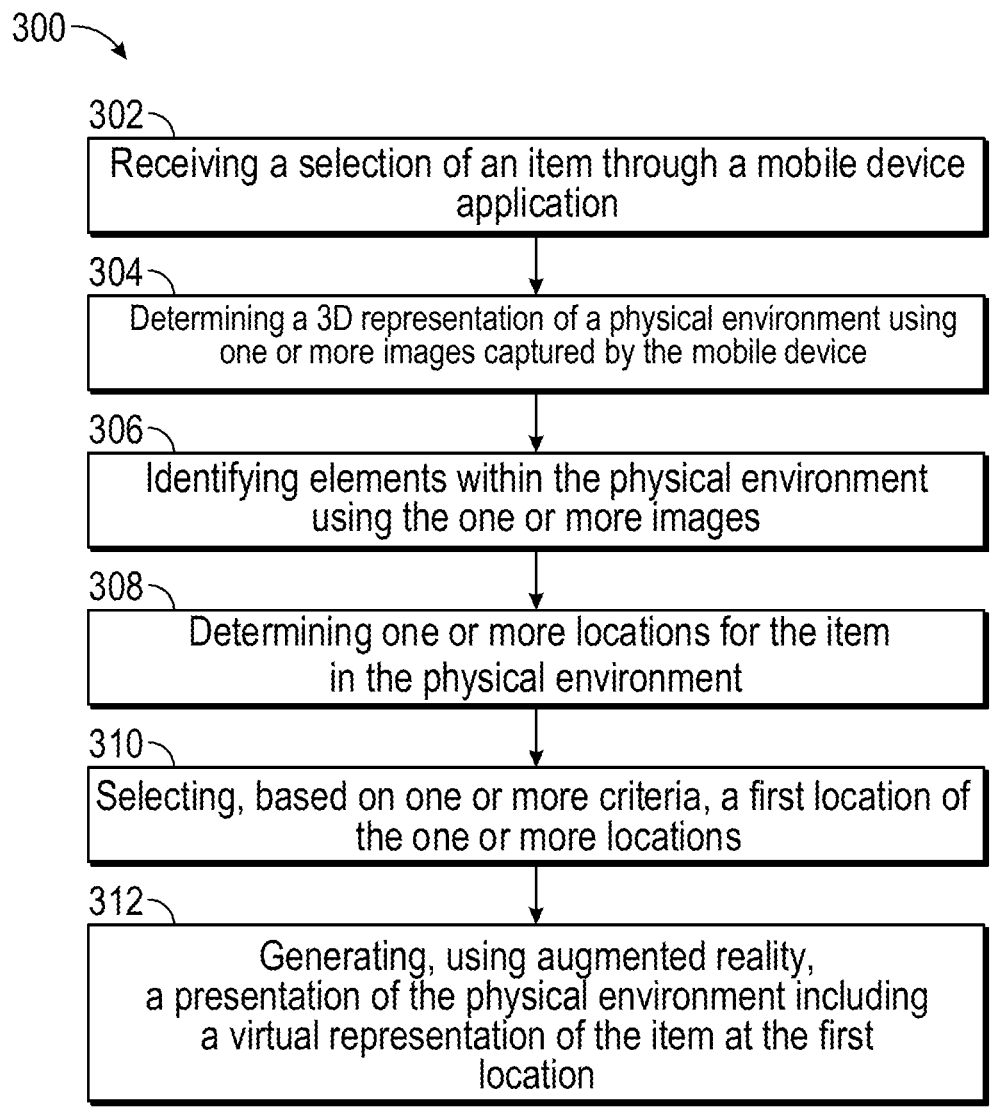
FIG. 3A illustrates a flow diagram for a process for augmented reality object placement, in accordance with one or more example embodiments of the present disclosure.

FIG. 3A illustrates an example flow diagram 300 for a process for augmented reality object placement, in accordance with one or more example embodiments of the present disclosure.

Figure 4:
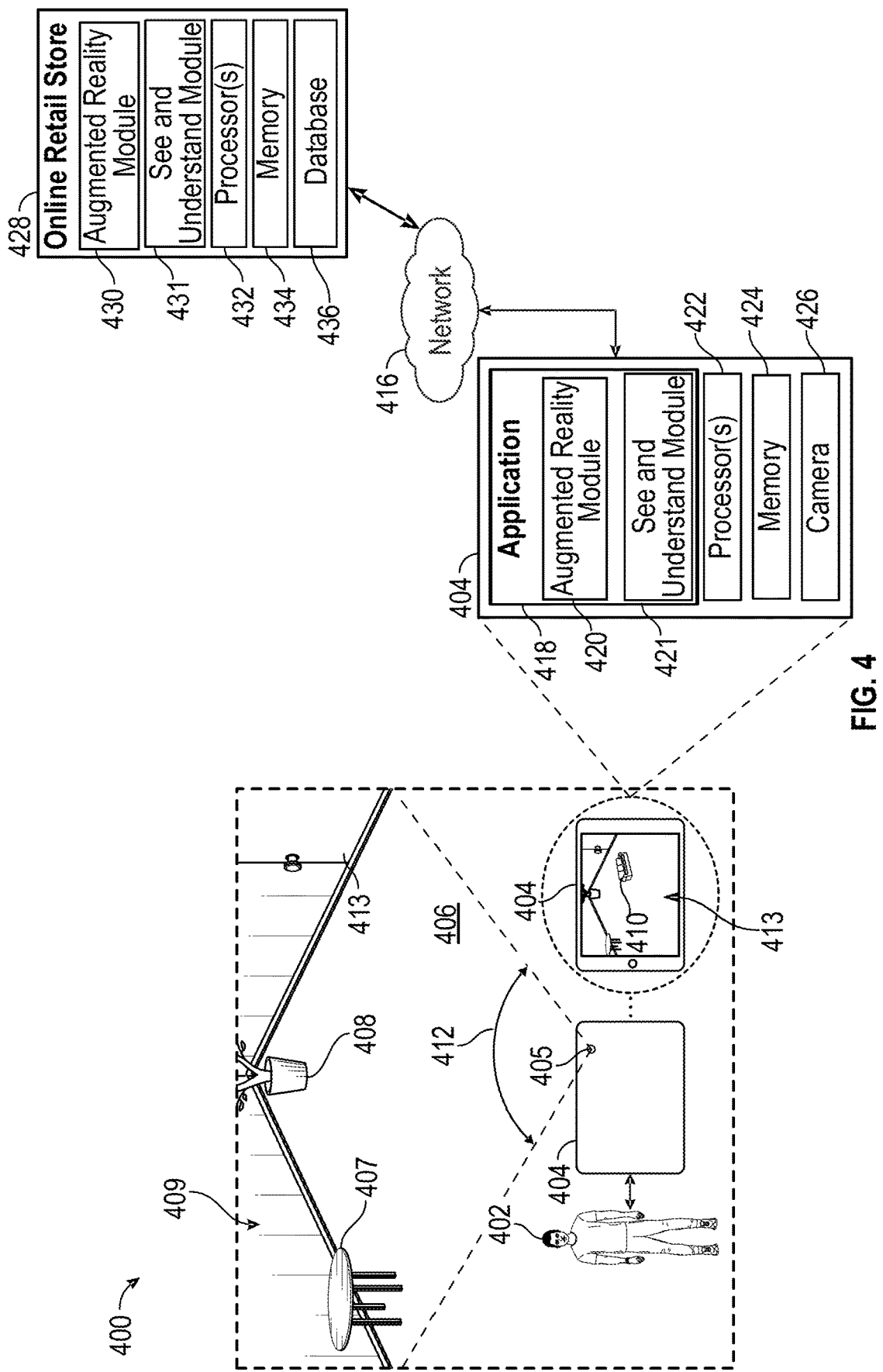
FIG. 4 illustrates an example system for augmented reality object placement, in accordance with one or more example embodiments of the present disclosure.

At block 302, an augmented reality system (which may for example be implemented at a device 404 or a remote network 418, both of which may be described with respect to FIG. 4) may receive a selection of an item through a mobile device application. In some instances, the item may be an item that the user finds through the application, which may be an online retail store. For example, the item may be a couch, a table, a plant, or any other type of item a user (for example, the user 102, user 202, or any other user described herein) may find in an online retail store. At block 304, the augmented reality system may determine a 3D representation of a physical environment using one or more images captured by the mobile device. In some instances, the one or more images may include a real-time view of the environment captured by a camera located on the mobile device. The 3D representation of the environment may include the real-time view of the environment that is presented on a display of the mobile device.

At block 306, the augmented reality system may identify elements within the physical environment using the one or more images. The elements may include anything that is included within the environment, such as one or more walls, one or more floors, and any objects found within the environment, such as a table, plant, door, or any other object found within the environment. If multiple of one type of element exists, the augmented reality system may classify these elements as distinct. For example, if there are determined to be two walls, they may be distinctly classified as a first wall and a second wall, so that they may be identified separately. At block 308, the augmented reality system may determine one or more locations for the object in the physical environment. For example, the augmented reality system may determine the one or more locations based on available wall space and available floor space. That is, the augmented reality system may determine portions of the identified walls and floors that are not already occupied by any objects (for example, free wall space and/or free floor space where a 3D representation of the item the user selected may be displayed).

At block 310, the augmented reality system may select, based on one or more criteria, a first location of the one or more locations. For example, the augmented reality system may select one of the identified available floor spaces for presentation of the virtual representation of the object. The criteria used to make this determination may be exemplified through the flow diagram 340. At block 312, the augmented reality system may generate, using augmented reality through the mobile device, a presentation of the physical environment including a virtual representation of the item at the first location. That is, once the location to present the item is identified, a 3D representation of the item may be generated and presented on the display along with the real-time view of the physical environment being captured by the camera of the mobile device. This way, the user may preview what the item would look like within the environment. The first location may be such that the item is presented in a location within the environment where it would likely physically be placed by the user. For example, if the item is a couch, the 3D representation of the couch may be presented as against a wall and on the floor, and facing in the correct orientation with the front of the couch facing away from the wall. This is an improvement on conventional systems that may simply present the item at a default location within the environment, and require the user to manually manipulate the virtual representation of the object within the augmented reality display presented on the mobile device. These conventional systems may also not be able to recognize existing objects, such that the virtual representation of the object may be dragged on dropped on top of another already existing object, whereas the systems and methods described herein automatically identify free floor space for the object.

Figure 3B:
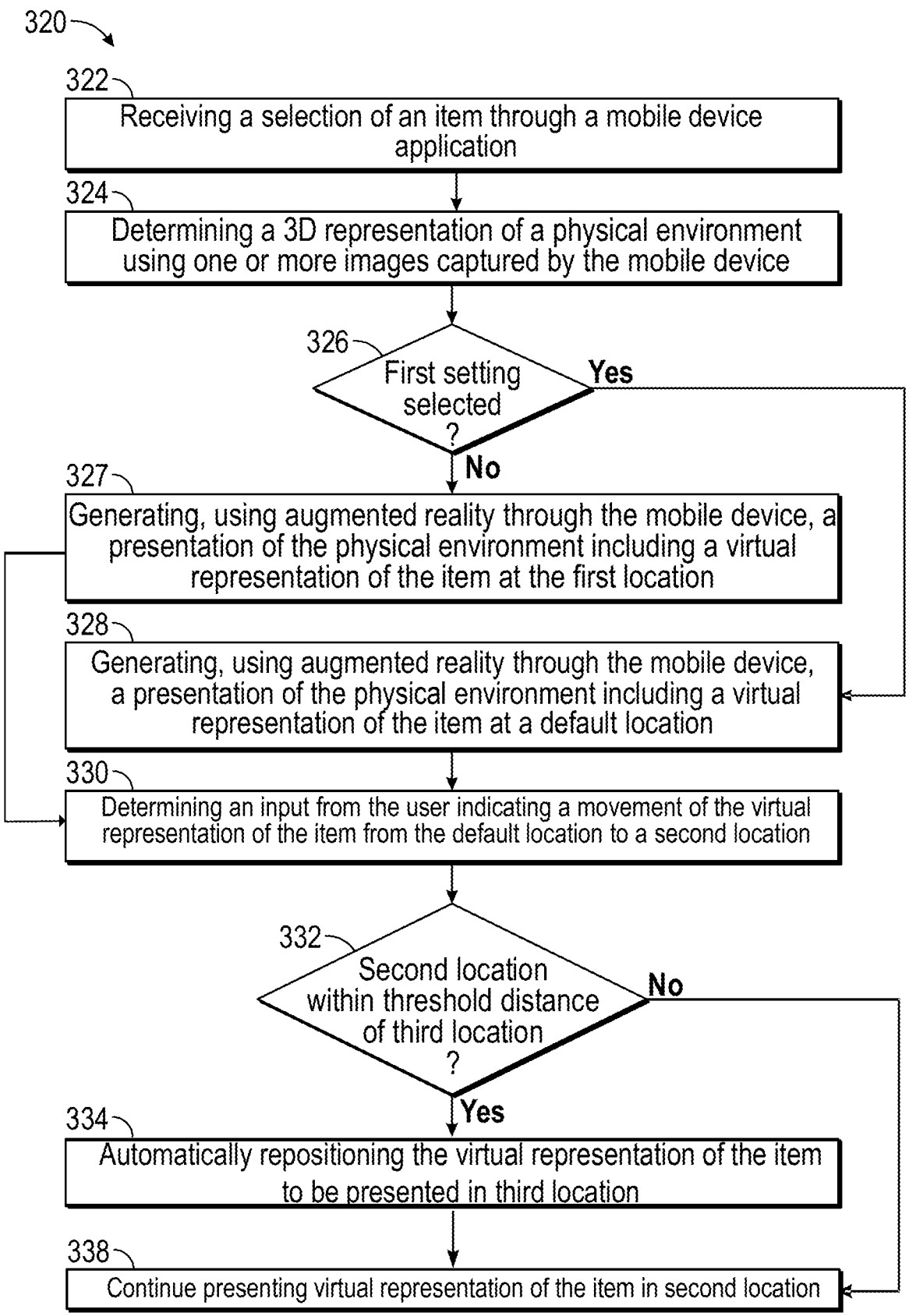
FIG. 3B illustrates a flow diagram for a process for augmented reality object placement, in accordance with one or more example embodiments of the present disclosure.

FIG. 3B illustrates an example flow diagram 320 for a process for augmented reality object placement, in accordance with one or more example embodiments of the present disclosure. At block 322, the augmented reality system may receive a selection of an item through a mobile device application. At block 324, the augmented reality system may determine a 3D representation of a physical environment using one or more images captured by the mobile device. In some instances, steps 322 and 324 may be similar to steps 302 and 304 described with respect to flow diagram 300.

Block 326 may involve a first condition of flow diagram 320. That is, block 326 may involve a determination if a first setting has been select by the user. In some embodiments, the first setting may be a setting indicating whether the user wants the augmented reality system to automatically position the object at a location, such as against a wall, or if the user would rather have the virtual representation of the object be presented in a default location so that the user may manually manipulate the virtual representation of the object to an initial location of their choosing. If the answer to this condition is yes, then the flow diagram 320 proceeds to block 328. If the answer to the condition is no, then the flow diagram 320 proceeds to block 327.

At block 328, the augmented reality system may generate, using augmented reality through the mobile device, a presentation of the physical environment including a virtual representation of the item at a default location. That is, the object is not automatically placed on a wall, but may be presented in a default location within the augmented reality display of the environment for the user to manually manipulate to a location of their choosing. As such, At block 330, the augmented reality system may determine an input from the user indicating a movement of the virtual representation of the object from the default location to a second location. The input may be in the form of the user interacting with a touch screen of the mobile device to drag the virtual representation of the object from the default location to a second location within the augmented reality display of the environment. Block 332 may involve a second condition of the flow diagram 320. That is, block 332 may involve a determination if the second location within threshold distance of third location. In some instances, the third location may be a wall space. That is, block 332 may involve a determination if the user has dragged the virtual representation of the object to within a threshold distance of a wall. If the answer to this condition is no, then the flow diagram may proceed to block 338. If the answer to this condition is yes, then the flow diagram may proceed to block 334. At block 338, the augmented reality system may continue to present the virtual representation of the object in the second location. That is, if the virtual representation of the object is not dragged to within a threshold distance of a wall, then the object may not be automatically repositioned to the wall. This threshold distance may be set by the user or automatically determined. Additionally, in some instances the third location may not necessarily be a wall, but may also be any other location within the augmented reality display of the environment. At block 334, the augmented reality system may reposition the virtual representation of the object to the third location. That is, the virtual representation of the object may be automatically repositioned on a wall if the virtual representation of the object is dragged to within the threshold distance of the wall by the user.

Returning to block 326, if it is determined that the first setting is not selected, then the flow diagram 320 proceeds to block 327. At block 327, the augmented reality system may generate, using augmented reality through the mobile device, a presentation of the physical environment including a virtual representation of the item at the first location. That is, if user has not selected a setting indicating that they wish for the virtual representation of the object to be placed in a default location, then the augmented reality system will proceed with presenting the virtual representation of the object in an initial location that is different from a default location (for example, as described with respect to flow diagram 300).

Figure 3C:
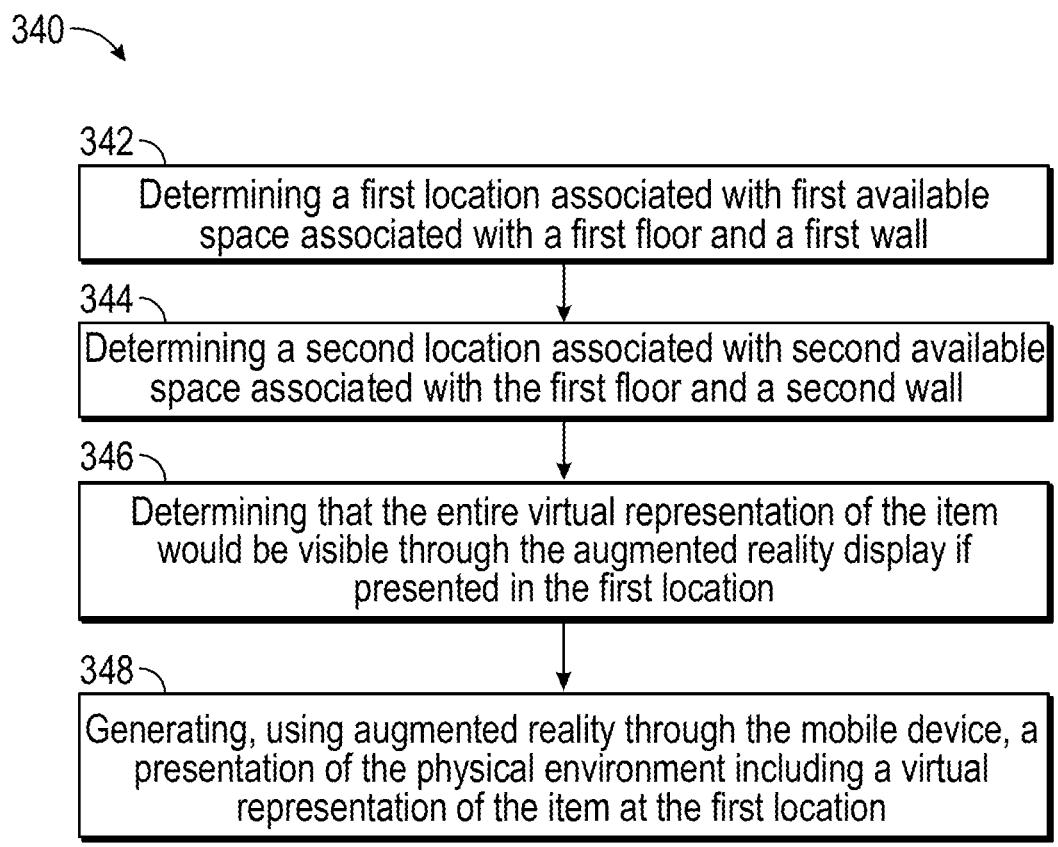
FIG. 3C illustrates a flow diagram for a process for augmented reality object placement, in accordance with one or more example embodiments of the present disclosure.

FIG. 3C illustrates an example flow diagram 340 for a process for augmented reality object placement, in accordance with one or more example embodiments of the present disclosure. At block 342, the augmented reality system may determine a first location associated with first available space associated with a first floor and a first wall. At block 344, the augmented reality system may determine a second location associated with second available space associated with the first floor and a second wall. At block 346 the augmented reality system may determine that the entire virtual representation of the object would be visible through the augmented reality display if presented in the first location. At block 348, the augmented reality system may generate, using augmented reality through the mobile device, a presentation of the physical environment including a virtual representation of the item at the first location.

FIG. 4 illustrates an example system 400 for augmented reality object placement, in accordance with one or more example embodiments of the present disclosure.

Referring to FIG. 4, the system 400 may include one or more devices 404, which may include, for example, mobile phones, tablets, and/or any other number and/or types of devices. The one or more devices 404 may include an application 418, which may include an augmented reality module 420 and/or a see and understand module 421. The augmented reality module 420 may be responsible for performing any of the operations described herein, such as presenting the augmented reality display to the user 402, including, for example, the virtual representation of the object, any overlays, the real-time view of the physical environment, etc. The see and understand module 421 may be responsible for performing any of the operations described herein, such as pre-processing or making any determinations with respect placement of a 3D representation of an object, for example. The one or more devices 404 may also include at least one or more processor(s) 422, memory 424, and/or a camera 426. The one or more devices may also include any other elements, such as described with respect to the computing element 500 of FIG. 5). The one or more devices 404 may be associated with one or more users 402. Additionally, the one or more users 402 may operate the one or more devices 404 within an environment 406. The environment 406 may be, for example, a physical room within a home of a user 402, but could also be located in any other context, such as a commercial office space. The environment may include one or more objects (for example, a table 407, a plant 408, a door, 413, and/or any other number and/or type of object). The environment may also include one or more walls 409 and/or one or more floors 411 (not shown). The objects may be physically located in the environment 406. The devices 404 may also include a camera 405 or other type of video capturing hardware component. The camera 405 may be used to capture a real-time view or a field of view 412 of the camera 405 in the environment 406. This real-time view may be presented on a device 404 through an augmented reality display 413 shown on a display of the device. The augmented reality display 413 may include a virtual representation of the object 410 that is being virtually displayed within the real-time view of the environment 408, and may also include the objects that are physically located within the environment 406. That is, a user 402 may be able to preview what an item looks like in a real environment 406 using the presentation of the item as a virtual representation of the object 410 in the augmented reality display 413 on the device 404.

The one or more devices 404 may be in communication with an online retail store 428 (e.g., a cloud-based network). The online retail store 428 may include one or more augmented reality modules 430 and/or a see and understand module 431. The augmented reality module 430 may be responsible for performing any of the operations described herein, such as presenting the augmented reality display to the user 402, including, for example, the virtual representation of the object, any overlays, the real-time view of the physical environment, etc. The see and understand module 431 may be responsible for performing any of the operations described herein, such as pre-processing or making any determinations with respect placement of a 3D representation of an object, for example. The online retail store 428 may also include at least one or more processor(s) 432, memory 434, and/or a database 436. The online retail store 428 may also include any other elements, such as described with respect to the computing element 500 of FIG. 5). In one or more embodiments, the one or more augmented reality modules 430 may perform any of the operations described herein relating to display of an item selected by a consumer as a virtual representation of the object 410 in an augmented reality display on the user's mobile device, including where the virtual representation of the object 410 is initially displayed, etc. That is, the operations described herein may be performed based on the one or more augmented reality modules 430 at a remote location (for example, the online retail store 428) or may be performed locally on the application 404 on the devices 404 themselves. Additionally, the database 436 may be used for storage of information about items the user selects through the online retail store 428 to display, virtually, in the environment 406 using augmented reality on the one or more devices 404. Such information may include, for example, metadata, such as the dimensions of the item. It should be noted that while the one or more devices 404 and/or the online retail store 428 may depict two separate modules, any number and/or combination of modules may similarly exist. For example, the augmented reality module and see and understand module may be combined into one module as well.

The one or more devices 404, the online retail store 428, and any other elements of the system 400 as described herein may be configured to communicate via a communications network 416. The communications network 416 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 416 may have any suitable communication range associated therewith and may include, for example, global networks (e.g., the Internet), metropolitan area networks (MANs), wide area networks (WANs), local area networks (LANs), or personal area networks (PANs). In addition, communications network 416 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 5:
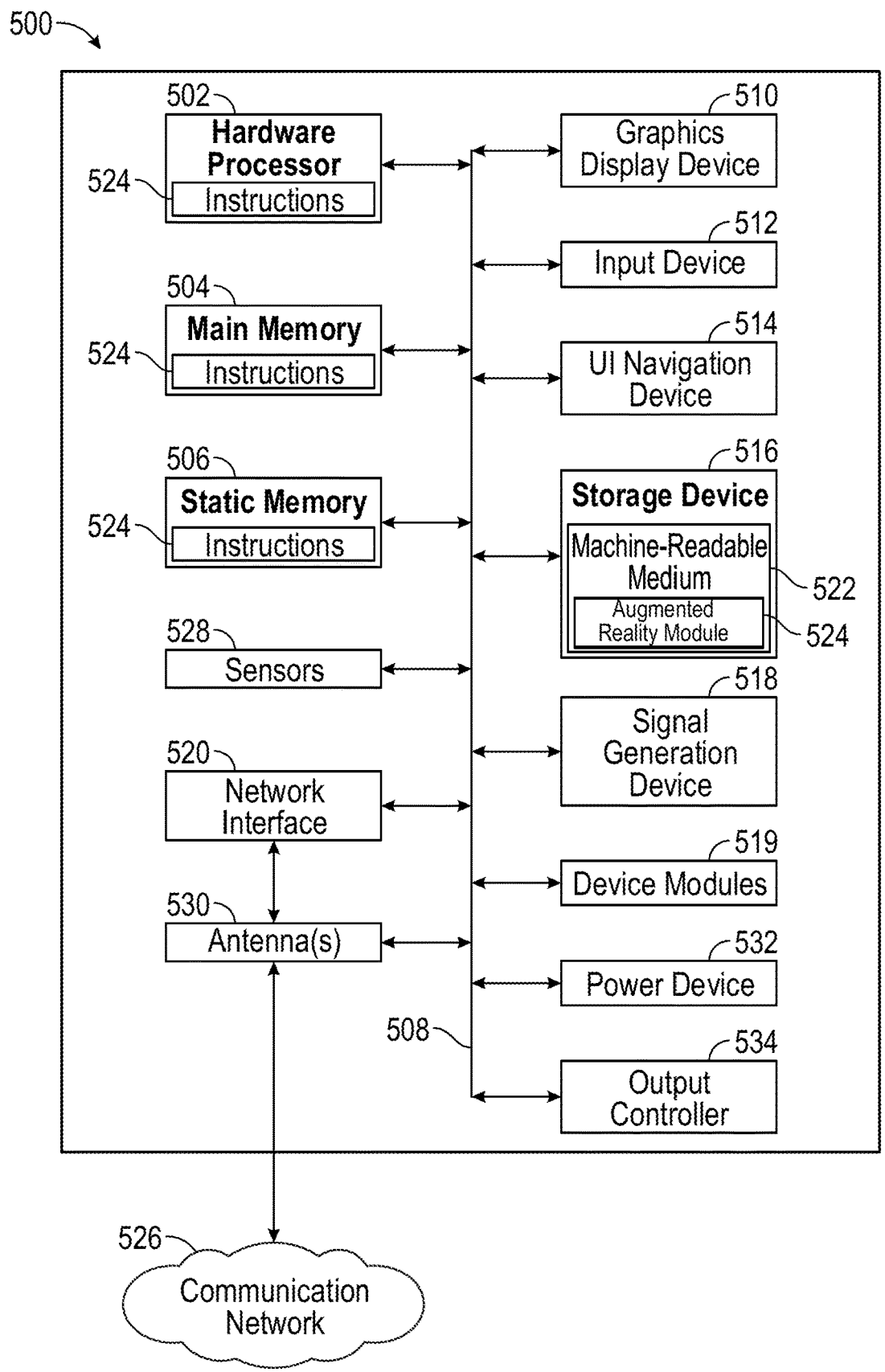
FIG. 5 illustrates a block diagram of an example machine upon which any of one or more techniques (e.g., methods) may be performed, in accordance with one or more example embodiments of the present disclosure.

FIG. 5 illustrates a block diagram of an example of a computing element 500 (for example, the mobile device 102, mobile device 202, mobile device 302, one or more devices 404, online retail store 428, or any other element described herein that may be used to perform processing of any sort) or system upon which any one or more of the techniques (e.g., methodologies) discussed herein may be performed. In other embodiments, the computing element 500 may operate as a standalone device or may be connected (e.g., networked) to other computing elements. In a networked deployment, the computing element 500 may operate in the capacity of a server machine, a client machine, or both in server-client network environments. In an example, the computing element 500 may act as a peer machine in Wi-Fi direct, peer-to-peer (P2P), cellular, (or other distributed) network environments. The computing element 500 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single computing element is illustrated, the term "computing element" shall also be taken to include any collection of computing elements that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The computing element (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The computing element 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The computing element 500 may additionally include a storage device (i.e., drive unit) 516, a signal generation device 518, one or more device modules 519 (e.g., the modules FIG. 3 implemented in a remote network and/or at a client device), a network interface device/transceiver 520 coupled to antenna(s) 530, and one or more sensors 528, such as a microphone, a global positioning system (GPS) sensor, a compass, an accelerometer, gyroscope, camera, or other sensor. In some instances, the one or more sensors 528 may be used to determine a position and/or orientation of the computing element 500. The computing element 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine readable medium 522 on which is stored one or more sets of data structures or instructions (e.g., software), which may include one or more augmented reality modules 524 embodying or utilized by any one or more of the techniques or functions described herein (for example, for implementing the flow diagrams of FIGS. 3-A-3C, as well as any other methods described herein). The instructions may also reside, completely or at least partially, within the main memory 504, within the static memory 506, or within the hardware processor 502 during execution thereof by the computing element 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the computing element 500 and that cause the computing element 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, Bluetooth technical standards, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the computing element 500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
   receiving, by at least one processor coupled to memory, a request for an augmented reality presentation of an object in a physical environment using a mobile device;
   receiving a three-dimensional (3D) model of the object, the 3D model including one or more dimensions and a reference plane;
   presenting, for display on the mobile device, an instruction to capture data associated with the physical environment using one or more sensors of the mobile device;
   determining a 3D model of the physical environment using the data associated with the physical environment;
   determining that a first surface in the 3D model of the physical environment corresponds to a first floor space and a second floor space, a second surface in the 3D model of the physical environment corresponds to a first wall space, and a third surface in the 3D model of the physical environment corresponds to a second wall space;
   generating a real-time virtual overlay in the physical environment, the real-time virtual overlay indicating the first floor space in the physical environment and the second floor space in the physical environment;
   determining that a first portion of the first floor space is unoccupied and sized to fit the 3D model of the object;
   automatically determining a first location in the 3D model of the physical environment for placement of a first virtual representation of the object based on the 3D model of the object, wherein the first location is within the first portion of the first floor space;
   automatically determining a second location in the 3D model of the physical environment for placement of a second virtual representation of the object based on the 3D model of the object, wherein the second location is within a second portion of the second floor space;
   determining a first distance value and a second distance value for the 3D model of the object, the first distance value indicating a first distance from the 3D model of the object at the first location to the first wall space, and the second distance value indicating a second distance from the 3D model of the object at the second location to the second wall space;
   determining that the first distance value satisfies a threshold distance value and that the second distance value fails to satisfy the threshold distance value;
   selecting, automatically, the first location over the second location;
   determining a first orientation of the 3D model of the object in which the reference plane of the 3D model of the object is aligned with a second orientation of the second surface;
   generating the first virtual representation of the object for display at the first location and in the first orientation; and
   generating, by the mobile device, a first real-time view of the physical environment, the first real-time view of the physical environment including the first virtual representation of the object at the first location and in the first orientation.

2. The method of claim 1, wherein the selection of the first location over the second location is further based on a determination that the first virtual representation of the object would be in full view within the first real-time view of the physical environment when the first virtual representation of the object is in the first location.

3. The method of claim 1, further comprising:
   receiving an indication of a user input to move the first virtual representation of the object in the first real-time view of the physical environment from the first location to a third location within the first real-time view of the physical environment;
   determining that the third location is within a threshold distance from a fourth location in the first real-time view of the physical environment, the fourth location including a third wall space that is unoccupied and large enough to accept the first virtual representation of the object;
   automatically generating a third virtual representation of the object for display at the fourth location, the third virtual representation of the object based on a new orientation of the object, wherein the new orientation of the object is based on the first orientation of the object and an orientation of the third wall space; and
   generating, by the mobile device, a second real-time view of the physical environment, the second real-time view of the physical environment including the third virtual representation of the object at the fourth location, wherein the third virtual representation of the object is aligned with the third wall space so a front of the third virtual representation of the object is facing away from the third wall space and a back of the third virtual representation of the object is facing the third wall space.

4. A method comprising:
   receiving, by a device having a sensor, an indication of an object to be viewed in a physical environment of the device;
   determining a three-dimensional (3D) model of the physical environment using data of the physical environment captured by the sensor;
   determining that a first surface in the 3D model of the physical environment corresponds to a first floor space and a second floor space, a second surface in the 3D model of the physical environment corresponds to a first wall space, and a third surface in the 3D model of the physical environment corresponds to a second wall space;
   determining that a first portion of the first surface is unoccupied and sized to fit the object;
   determining a first location in the 3D model of the physical environment for placement of a first virtual representation of the object based on a 3D model of the object, wherein the first location corresponds to the first portion of the first surface;
   determining a second location of the 3D model of the physical environment for placement of a second virtual representation of the object based on the 3D model of the object, wherein the second location corresponds to a second portion of the first surface;
   determining a first distance value and a second distance value for the 3D model of the object, the first distance value indicating a first distance from the 3D model of the object at the first location to the first wall space, the second distance value indicating a second distance from the 3D model of the object at the second location to the second wall space;

selecting, automatically, the first location over the second location based on the first distance value and the second distance value;

generating the first virtual representation of the object for display at the first location, the first virtual representation of the object having a first orientation, wherein the first orientation is based on a second orientation of the second surface; and generating a first real-time view of the physical environment comprising the first virtual representation of the object within the first portion of the first surface at the first location and in the first orientation.

5. The method of claim 4, wherein the selection of the first location over the second location is further based on a determination that the first virtual representation of the object would be in full view in the first real-time view of the physical environment when in the first location.

6. The method of claim 4, wherein determining the first location comprises:

determining a change from a first orientation of the device to a second orientation of the device, the first orientation of the device and the second orientation of the device both being in reference to the 3D model of the physical environment; and determining a second real-time view of the physical environment, the second real-time view of the physical environment including a third virtual representation of the object based on the second orientation of the device, wherein the third virtual representation of the object is in the first location in the second real-time view of the physical environment.

7. The method of claim 4, further comprising:

receiving an indication of a user input to move the first virtual representation of the object in the first real-time view of the physical environment from the first location to a third location;

determining the third location is within a threshold distance from a fourth location, the fourth location associated with a third wall space in the first real-time view of the physical environment;

automatically generating a third virtual representation of the object for display at the fourth location, the third virtual representation of the object having a new orientation of the object, wherein the new orientation of the object is based on a third orientation of the third wall space; and generating a second real-time view of the physical environment, the second real-time view including the third virtual representation of the object at the fourth location.

8. The method of claim 4, further comprising:

receiving the 3D model of the object, wherein the 3D model of the object includes one or more dimensions and a reference plane.

9. The method of claim 4, further comprising:

generating a real-time virtual overlay in the physical environment, the real-time virtual overlay indicating a location of the first surface in the physical environment.

10. The method of claim 4, wherein the first distance value is less than the second distance value.

11. The method of claim 4, further comprising determining that the first distance value satisfies a threshold distance value.

12. The method of claim 11, further comprising determining that the second distance value fails to satisfy the threshold distance value.

13. A device comprising memory coupled to at least one processor, the at least one processor configured to:

receive an indication of an object to be viewed in a physical environment of the device;

determine a three-dimensional (3D) model of the physical environment using data of the physical environment captured by a sensor of the device;

determine that a first surface in the 3D model of the physical environment corresponds to a first floor space and a second floor space, a second surface in the 3D model of the physical environment corresponds to a first wall space, a third surface in the 3D model of the physical environment corresponds to a second wall space;

determine that a first portion of the first surface is unoccupied and sized to fit the object;

determine a first location in the 3D model of the physical environment for placement of a first virtual representation of the object based on a 3D model of the object, wherein the first location corresponds to the first portion of the first surface;

determine a second location of the 3D model of the physical environment for placement of a second virtual representation of the object based on a 3D model of the object, wherein the second location corresponds to a second portion of the first surface;

determine a first distance value and a second distance value for the 3D model of the object, the first distance value indicating a distance from the 3D model of the object at the first location to the first wall space, and the second distance value indicating a distance from the 3D model of the object at the second location to the second wall space; and select, automatically, the first location over the second location based on the first distance value and the second distance value;

generate the first virtual representation of the object for display at the first location, the first virtual representation of the object having a first orientation, wherein the first orientation is based on a second orientation of the second surface or a third orientation of an edge of the first surface; and generate a first real-time view of the physical environment comprising the first virtual representation of the object within the first portion of the first surface at the first location and in the first orientation.

14. The device of claim 13, wherein the selection of the first location over the second location is further based on a determination that the first virtual representation of the object would be in full view in the first real-time view of the physical environment when in the first location.

15. The device of claim 13, wherein determining the first location comprises:

determine a change from a first orientation of the device to a second orientation of the device, the first orientation of the device and the second orientation of the device both being in reference to the 3D model of the physical environment; and determine a second real-time view of the physical environment, the second real-time view of the physical environment including a third virtual representation of the object based on the second orientation of the device, wherein the third virtual representation of the object is in the first location in the second real-time view of the physical environment.

16. The device of claim 13, wherein the at least one processor is further configured to:
   receive an indication of a user input to move the first virtual representation of the object in the first real-time view of the physical environment from the first location to a third location;
   determine the third location is within a threshold distance from a fourth location, the fourth location associated with a third wall space in the first real-time view of the physical environment;
   automatically generate a third virtual representation of the object for display at the fourth location, the third virtual representation having a new orientation of the object, wherein the new orientation of the object is based on a fourth orientation of the third wall space; and
   generate a second real-time view of the physical environment, the second real-time view including the third virtual representation of the object at the fourth location.

17. The device of claim 13, further comprising:
   receiving the 3D model of the object, wherein the 3D model of the object includes one or more dimensions and a reference plane.

18. The device of claim 13, wherein the at least one processor is further configured to:
   generate a real-time virtual overlay in the physical environment, the real-time virtual overlay indicating a location of the first surface in the physical environment.

19. The device of claim 13, wherein the first distance value is less than the second distance value.

20. The device of claim 13, wherein the at least one processor is further configured to determine that the first distance value satisfies a threshold distance value.

21. The device of claim 20, wherein the at least one processor is further configured to determine that the second distance value fails to satisfy the threshold distance value.

* * * * *